United States Patent Office 3,077,995
Patented Feb. 19, 1963

3,077,995
CONVEYOR BELT FEEDING MECHANISMS
Edmond P. O. Booth and Eugene W. Innes, Johannesburg, Transvaal, Republic of South Africa, assignors to Edward L. Bateman Limited, Johannesburg, Transvaal, Republic of South Africa, a South African company
Filed Dec. 8, 1960, Ser. No. 74,646
Claims priority, application Republic of South Africa Feb. 15, 1960
7 Claims. (Cl. 214—17)

This invention relates to feeding mechanisms for conveyor belts and other equipment requiring feeding from a stock-pile or bin. In view of the fact that the invention is primarily concerned with feeding conveyor belts, the term "conveyor belt" will be used in this specification with a slightly extended meaning. It is intended to cover any thing accepting comminuted material swept off a shelf for transport elsewhere.

In the art of feeding comminuted material such as ore on to a belt from a storage bin or pile two well known systems exist.

According to one of these known arrangements a tunnel is provided under the bin and one or more gate controlled apertures in the tunnel serve to feed material on to a conveyor belt below the apertures. A supplementary conveyor belt or feeder may be used to guide material from each gate on to a main belt.

This system has various disadvantages, among which mention might be made of the tendency material has to form pipes in the bin and that the apertures have to be fairly widely spaced in order not to weaken the roof of the tunnel. Further, the tunnel has to be of substantial dimensions in order to accommodate fixed chutes for leading material from the apertures onto the conveyor belt.

The other well known system is one in which a shelf is provided which is supplied with material through a series of apertures, the material taking up its natural position of repose on the shelf. A rotating plough in the form of a hub with a series of spaced vanes passes up and down the shelf shovelling material on to the conveyor belt. The chief disadvantages of this system are (a) that a large width of tunnel is required to accommodate the plough and (b) due to the rotating nature of the plough, rock material has a tendency to become jammed between the vane tips and the shelf.

An object of the present invention is to provide a feeding mechanism in which most, if not all, of the disadvantages of the known system are at least minimised.

According to the invention a feeding mechanism for sweeping comminuted material off a shelf onto a conveyor belt comprising a carriage mounted on a track for movement to and fro along the belt parallel thereto, at least one sweeping arm pivotally coupled to the carriage with a sweeping face to each side thereof, the arm being movable between two operative positions in each of which the arm is correctly angled for a particular direction of travel of the carriage, and retaining means movable between an operative condition in which it holds the arm in one of the positions and an inoperative condition in which it releases the arm, the retaining means being biased towards the operative condition and adapted to engage a cam along the track for displacement towards the inoperative condition to release the sweeping arm from one position when the carriage approaches the end of a run and to keep the arm released on continued movement of the carriage along the run so as to permit movement of the arm to the other position through engagement of the arm by the material, the retaining means being permitted to return to the operative condition to hold the arm in the other position preparatory to movement of the carriage in the reverse direction.

Further according to the invention a feeding mechanism for sweeping comminuted material off a shelf onto a conveyor belt comprising a carriage mounted on a track for movement to and fro along the belt parallel thereto, at least two sweeping arms each with a sweeping face to each side thereof and pivotally coupled to the carriage, the arms being spaced apart along the belt and coupled together for simultaneous movement, means for limiting the movement of each arm about its pivot between two extreme operating positions each of which ensures the correct position of the arm for a particular direction of travel of the carriage and retaining means to hold the arms in one of the two extreme positions and including an element located between the arms and movable across the carriage between an operative condition in which the arms are held and an inoperative condition in which the arms are released, said element being biased towards the operative condition, a cam along the track engaged by said element for displacement of the element towards the inoperative condition to release the arms from one extreme position when the carriage approaches the end of a run and to keep the arms released on continued movement of the carriage along the run thereby to permit movement of the arms to the other extreme position through engagement of the arms by the material, said element being permitted to return to the operative condition to hold the arms in the other extreme position preparatory to movement of the carriage in the reverse direction.

Further in addition to the above combination a feeding mechanism in which each arm is equipped with a horizontally disposed quadrant-like member defining to one side thereof a formation against which a mating stop on the element is adapted to abut to hold the arm pair in the correct lie for the direction of travel of the carriage, the quadrants being shaped to ride under the element during the change over of the arms from one extreme position to the other, and in which each arm is equipped with a horizontally-disposed quadrant-like member defining to one side thereof a formation against which a mating stop on the element is adapted to abut to hold the arm pair in the correct lie for the direction of travel of the carriage, the quadrants being shaped to ride under the element during the change over of the arms from one extreme position to the other, and in which spring means are provided to provide biasing action on the element.

In the preferred forms of the invention a plurality of arms are pivoted on the carriage and are coupled together for simultaneous movement about their pivots. Preferably two arms are each provided with a locking element, each element in turn being adapted to engage a catch adapted to hold the arms alternately in the first and second positions.

The catch and locking elements are part of a release means which automatically permits change over of the arms from the one extreme position to the other preparatory to the carriage being reversed.

In the preferred examples of the invention the release means includes a member which is adapted to engage a cam device along the track to effect change over of the arms, the catch being fast with the member and the member being biased against the movement imposed by the switching device.

Other novel features will appear from the description hereunder of an example of the invention, the decription being with reference to the accompanying drawings in which.

Figure 1:
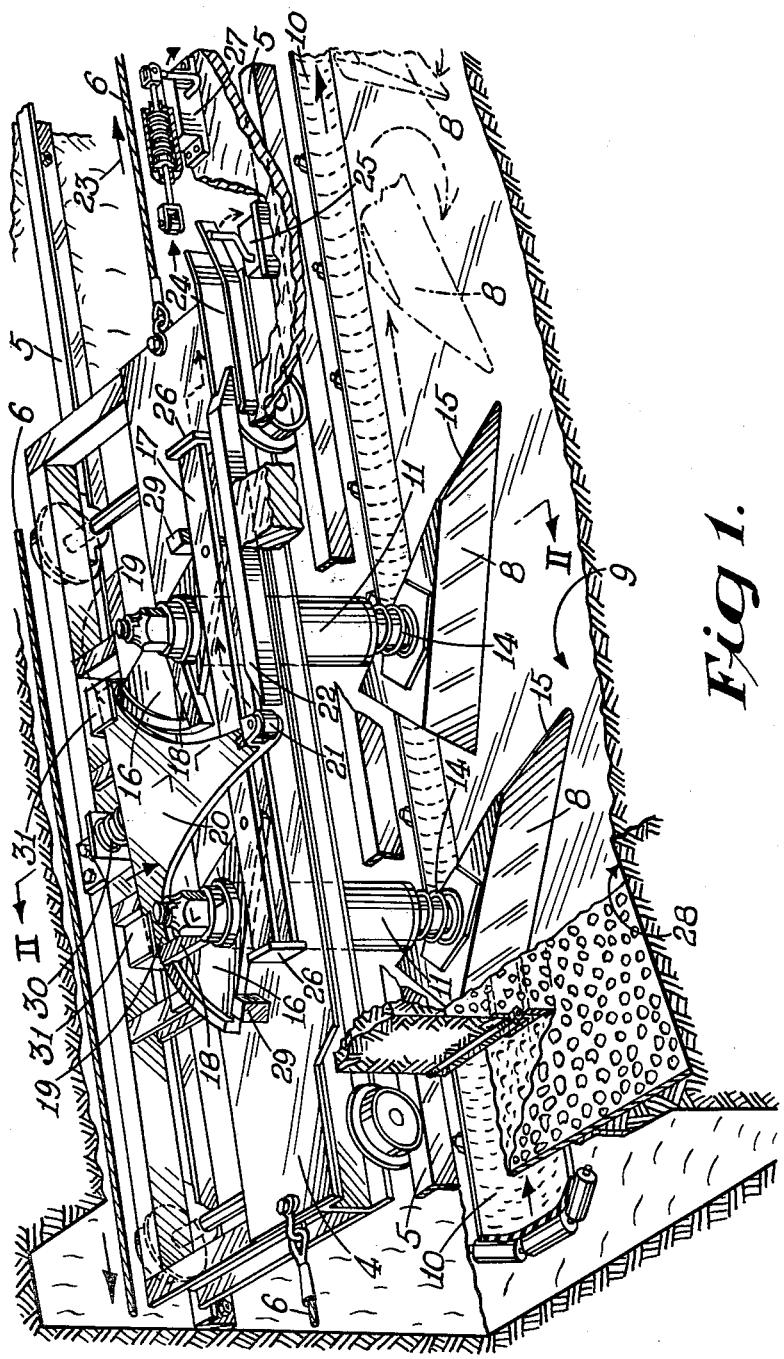
FIGURE 1 is a perspective view of the feeding mechanism with parts broken away.
Figure 3:
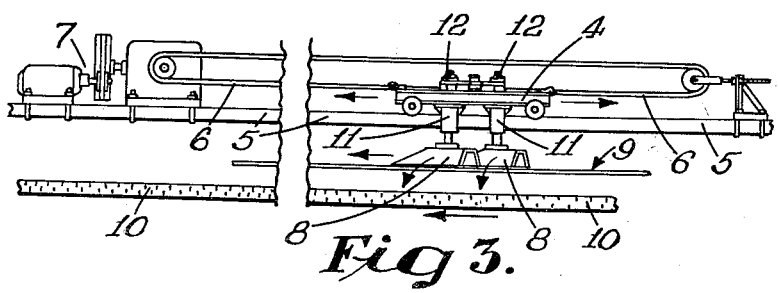
FIGURE 3 is a front schematic view of the device.

Referring to FIGURE 1, the feeding mechanism includes a carriage 4 which is moved to and fro along a rail track 5 by means of a suitable power unit which is coupled to the carriage through hawsers 6. The power unit is shown in FIGURE 3 by the reference 7.

The rail track 5 is strategically located so that a pair of sweeping arms 8 may sweep over the top of a shelf 9 situated to receive comminuted material from a storage bin 28. The material spills across the shelf and lies at its natural angle of repose ready to be swept off the shelf by the arms on to a conveyor belt 10. As material moves off the shelf so further supplies pass out of the bin on to the shelf.

Figure 2:
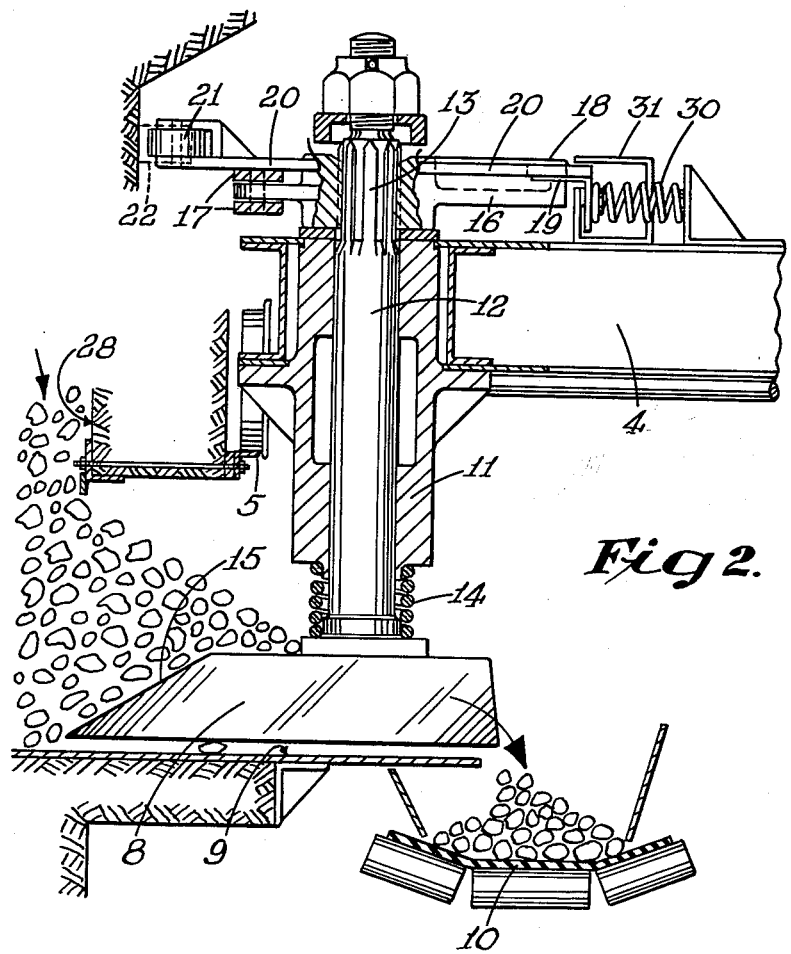
FIGURE 2 is a sectional side elevation on the line II—II of FIGURE 1.

In FIGURE 2 the detail of the arms is more clearly shown. Each arm is held in a sleeve 11 and by splining arm shaft 12 as shown by reference 13 a degree of vertical movement is allowed the arm, the arm being biased downwardly by spring 14. The movement referred to in this paragraph permits the arms to yield when material gets wedged under the arms.

The arms themselves are shaped rather in the nature of plough shares, the bow portions 15 being swept back substantially.

Fast with the shaft 12 there is a quadrant 16 and the quadrants on the two shafts 12 are coupled together as shown by means of a coupling bar 17. On each quadrant there is a locking element 18 and during movement of the carriage one such element is always in contact with a catch 19 provided by a member 20. In FIGURE 1 the left hand locking element 18 is in engagement with its associated catch 19 and clockwise rotation of the arms about their pivots is prevented.

Towards the end of a run in one direction a roller 21 on the member 20 engages a stationary roller track 22 to move the member transversely over the carriage into a release position. In the latter position the catch is cleared from the locking element on the left hand quadrant so that the arms are free to swing about their pivots. Ultimately the arms will be moved into the position shown in chain line in FIGURE 1 ready for movement in the opposite direction. When the arms reach the chain line position the roller 21 will have cleared the track 22 and in doing so the catch 19 on the right hand side of the member will be positioned to engage the element 18 on the right hand quadrant. The apparatus is now locked for movement in a direction opposite to that shown by arrow 23. Simultaneously with the re-locking step set out above the roller will urge a leaf spring arrangement 24 outwardly to operate a reversing switch 25. A similar roller track and reversing switch are found at the opposite end of the carriage track.

In the event of the reversing switch failing to operate, a buffer zone 26 on the coupling bar engages a piston-like switch member 27 to shut off the prime mover. In addition the arrangement is designed so that switch 27 will be operated by the buffer zone 26 should change over of the arms not occur, and this will take place before the roller is in position to operate the reversing switch 25.

Experimental work has shown that the arms should toe outwardly about ten degrees.

The actual shape of the arms has been found to be a fairly critical matter and a swept back bow is practically essential to ensure the effective working of the mechanism.

The device of the invention provides a robust sweeping mechanism which may be relied upon to perform its functions efficiently over long periods with very little attention being required by way of servicing. Further, its fully automatic nature dispenses with the need for attendants at a loading station.

The actual rotation of the arms from one extreme position to the other is effected by moving the arms through the material after their release from the catch 19. In order to check the movement of the arms and thus substantially to define the extreme positions, abutments 29 on the carriage engage the quadrants 16 and thus hold them until re-latching takes place for movement in the reverse direction.

Member 20 is spring biased against movement due to engagement between the roller 21 and the roller track 22 by spring means 30. Further member 20 is constrained for movement in a prescribed path by shoe brackets 31.

Figure 4:
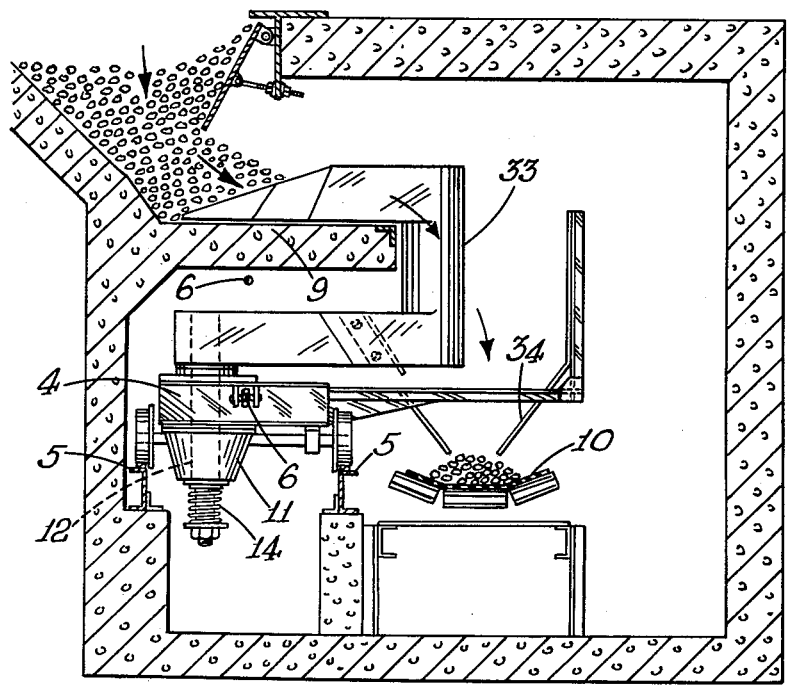
FIGURE 4 is a section of an alternative arrangement of the invention.

In the arrangement shown in FIGURE 4 the rail track 5 for the carriage 4 is located directly below the shelf 9. As the general mechanism of this example is in essence the same as that described with reference to FIGURES 1, 2 and 3 the same references are used in all the figures save in respect of the U-shaped arms 33 and the travelling chute 34. This example has the advantage of keeping the carriage clear of the working area at all times, the U-shaped arms 33 being pivoted on the carriage with the shelf in the space between the limbs of the arms. Chute 34 is coupled to the carriage and moves therewith, material being swept from the shelf through the chute on to the conveyor belt.

In yet another example of the invention the rail track is located directly above the shelf and not to one side thereof. Clearly the invention provides numerous examples each differing from the other in matters of detail only.

We claim:

1. A feeding mechanism for sweeping comminuted material off a shelf onto a conveyor belt comprising a carriage mounted on a track for movement to and fro along the belt parallel thereto, at least one sweeping arm pivotally coupled to the carriage with a sweeping face to each side thereof, the arm being movable between two operative positions in each of which the arm is correctly angled for a particular direction of travel of the carriage, and retaining means movable between an operative condition in which it holds the arm in one of the positions and an inoperative condition in which it releases the arm, said retaining means being biased towards the operative condition, a cam along the track engaged by the retaining means for displacement of the retaining means toward the inoperative condition to release the sweeping arm from one position when the carriage approaches the end of a run and to keep the arm released on continued movement of the carriage along the run so as to permit movement of the arm to the other position through engagement of the arm by the material, the retaining means being permitted to return to the operative condition to hold the arm in the other position preparatory to movement of the carriage in the reverse direction.

2. A feeding mechanism claimed in claim 1, in which the carriage is mounted on wheels for movement along the track, and in which the rail track is located beneath the shelf and the arm is U-shaped to accommodate the shelf in the space between the limbs of the arm.

3. A feeding mechanism claimed in claim 1, in which the carriage is mounted on wheels for movement along the track, and in which the rail track is located beneath the shelf and the arm is U-shaped to accommodate the shelf in the space between the limbs of the arm, and further in which a chute is provided fast with the carriage for the discharge of material from the shelf onto the belt.

4. A feeding mechanism for sweeping comminuted material off a shelf onto a conveyor belt comprising a carriage mounted on a track for movement to and fro along the belt parallel thereto, at least two sweeping arms each with a sweeping face to each side thereof and pivotally coupled to the carriage, the arms being spaced apart along the belt and coupled together for simultaneous movement, means for limiting the movement of each arm about its pivot between two extreme operating positions each of which ensures the correct position of the arm for a particular direction of travel of the carriage and retaining means to hold the arms in one of the two extreme positions and including an element located between the arms and movable across the carriage between an operative condition in which the arms are held and an inoperative condition in which the arms are released, said element being biased towards the operative condition, a cam along the track engaged by said element for displacement of the element towards the inoperative condition to release the arms from one extreme position when the carriage approaches the end of a run and to keep the arms released on continued movement of the carriage along the run thereby to permit movement of the arms to the other extreme position through engagement of the arms by the material, said elements being permitted to return to the operative condition to hold the arms in the other extreme position preparatory to movement of the carriage in the reverse direction.

5. A feeding mechanism for sweeping comminuted material off a shelf onto a conveyor belt comprising a carriage mounted on a track for movement to and fro along the belt parallel thereto, at least two sweeping arms each with a sweeping face to each side thereof and pivotally coupled to the carriage, said arms being spaced apart along the belt and coupled together for simultaneous movement, means for limiting the movement of each arm about its pivot between two extreme operative positions each of which ensures the correct angle of the arm for a particular direction of travel of the carriage, retaining means to hold the arms in one of the two extreme positions and including an element which is located between said arms and is biased towards an operative condition in which the arms are held but is movable across the carriage towards an inoperative condition in which the arms are released, a horizontally-disposed quadrant-like member fixed to each arm, each quadrant member defining to one side thereof a formation against which a mating stop on the element is adapted to abut to hold the arms in the correct lie for the direction of travel of the carriage, a cam along the track engaged by said element for displacement of the element towards the inoperative condition to release the arms from one extreme position when the carriage approaches the end of a run and to keep the arms released on continued movement of the carriage along the run thereby to permit movement of the arms to the other extreme position through engagement of the arms by the material, said element being permitted to return to the operative condition to hold the arms in the other extreme position preparatory to movement of the carriage in the reverse direction and the quadrant members being shaped to move past the element during the change over of the arms from one extreme position to the other.

6. A feeding mechanism for sweeping comminuted material off a shalf onto a conveyor belt comprising a carriage mounted on a track for movement to and fro along the belt parallel thereto, at least two sweeping arms each with a sweeping face to each side thereof and pivotally coupled to the carriage, said sweeping arms being spaced apart along the belt and coupled together for simultaneous movement, means for limiting the movement of each sweeping arm about its pivot between two extreme operative positions each of which ensures the correct angle of the arm for a particular direction of travel of the carriage, retaining means to hold said sweeping arms in one of the two extreme operative positions each of which ensures the correct angle of the arm for a particular direction of travel of the carriage, retaining means to hold said sweeping arms in one of the two extreme positions and including an element located between the arms and movable across the carriage between an operative condition in which the arms are held and an inoperative condition in which the arms are released, spring means for biasing said element towards the operative condition, a horizontally disposed quadrant-like member fixed to each arm, each quadrant member having on one side thereof a formation, a mating stop on said element adapted to abut to hold the arms in the correct angle for the direction of the carriage, a cam along the track engaged by said element for displacement of the element towards the inoperative condition to release the arms from one extreme position when the carriage approaches the end of a run and to keep the arms released on continued movement of the carriage along the run thereby to permit movement of the arms to the other extreme position through engagement of the arms by the material, said element being permitted to return to the operative condition to hold the arms in the other extreme position preparatory to movement of the carriage in the reverse direction and said quadrant members being shaped to move past the element during the change over of the arms from one extreme position to the other.

7. A feeding mechanism for sweeping comminuted material off a shelf onto a conveyor belt comprising a carriage adapted to be mounted on a track for movement to and fro along the belt parallel thereto, at least one sweeping arm pivotally coupled to the carriage with a sweeping face to each side thereof, said sweeping arm being movable between two operative positions in each of which the arm being correctly angled for a particular direction of travel of the carriage, retaining means movable between an operative condition in which it holds the arm in one of the positions and an inoperative condition in which it releases the arm, said retaining means being biased toward the operative condition, a cam along the track engaged by said retaining means for displacement of the same towards the inoperative condition to release the sweeping arm from one position when the carriage approaches the end of a run and to keep the arm released on continued movement of the carriage along the run thereby to permit movement of the arm to the other position through engagement of the arm by the material, said retaining means being permitted to return to the operative condition to hold the arm in the other position preparatory to movement of the carriage in the reverse direction, and means causing movement of the arm on the carriage in a prescribed vertical path, the arm being spring biased to the lowest point on the path and being adapted to yield upwardly against material penetrating thereunder.

References Cited in the file of this patent

UNITED STATES PATENTS

| 2,794,561 | Brahmsiepe | June 4, 1957 |
| 2,823,834 | Buschmann | Feb. 18, 1958 |
| 2,892,552 | Van Zijp | June 30, 1959 |

FOREIGN PATENTS

| 834,227 | Germany | Mar. 17, 1952 |